US008015102B2

(12) United States Patent
Singer et al.

(10) Patent No.: US 8,015,102 B2
(45) Date of Patent: *Sep. 6, 2011

(54) SYSTEM AND METHOD FOR A TRADING INTERFACE INCORPORATING A CHART

(75) Inventors: Scott F. Singer, Lake Bluff, IL (US);
Michael J. Burns, Riverside, IL (US);
Stephen P. Decker, Naperville, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/639,695

(22) Filed: Dec. 16, 2009

(65) Prior Publication Data

US 2010/0169206 A1    Jul. 1, 2010

Related U.S. Application Data

(63) Continuation of application No. 11/321,228, filed on Dec. 29, 2005, now Pat. No. 7,711,631.

(51) Int. Cl.
*G06Q 40/00* (2006.01)
(52) U.S. Cl. .................. 705/37; 705/35; 705/36 R
(58) Field of Classification Search ............. 705/35, 705/36 R, 37
See application file for complete search history.

(56) References Cited

U.S. PATENT DOCUMENTS

| | | | |
|---|---|---|---|
| 6,211,880 B1 | 4/2001 | Impink, Jr. | |
| 6,772,132 B1 | 8/2004 | Kemp, II et al. | |
| 6,876,981 B1 | 4/2005 | Berckmans | |
| 7,127,424 B2 | 10/2006 | Kemp, II et al. | |
| 7,228,289 B2 | 6/2007 | Brumfield et al. | |
| 7,389,268 B1 | 6/2008 | Kemp, II et al. | |
| 2002/0026484 A1 | 2/2002 | Smith | |
| 2003/0004853 A1 | 1/2003 | Ram et al. | |
| 2004/0064351 A1 | 4/2004 | Mikurak | |
| 2004/0093300 A1 | 5/2004 | Burns | |
| 2004/0254804 A1 | 12/2004 | Peterffy et al. | |

OTHER PUBLICATIONS

International Search Report for PCT/US06/49415 mailed Mar. 20, 2008.
Virtual Reality on the Trading Desk, Lawton, George. Wall Street & Technology. New York: Feb. 1992. vol. 9, Iss. 6; p. 14 (3 pages).
CHX Seeks Order-Routing Partner, Ivy Schmerken. Wall Street & Technology. New York: Fall 2005. p. 11 (1 page).
Study Narrows Spread Between ECNs & Market Makers, Gregory Bresiger. Traders Magazine. New York: Aug. 1, 2005. p. 1.

*Primary Examiner* — Lalita M Hamilton
(74) *Attorney, Agent, or Firm* — McDonnell Boehnen Hulbert & Berghoff LLP

(57) ABSTRACT

A graphical interface and method are provided for displaying market information corresponding to a tradeable object. One graphical interface includes a chart region for displaying historical market data in relation to a first value axis, and a market grid region in alignment with the chart region. The market grid region comprises a plurality of areas for receiving commands from a user input device to send trade orders, and the areas are displayed in relation to a second value axis. A plurality of values displayed along the second value axis is a subset of values displayed in relation to the first value axis, and can be modified to a new plurality of values that corresponds to a new subset of values on the first value axis.

20 Claims, 13 Drawing Sheets

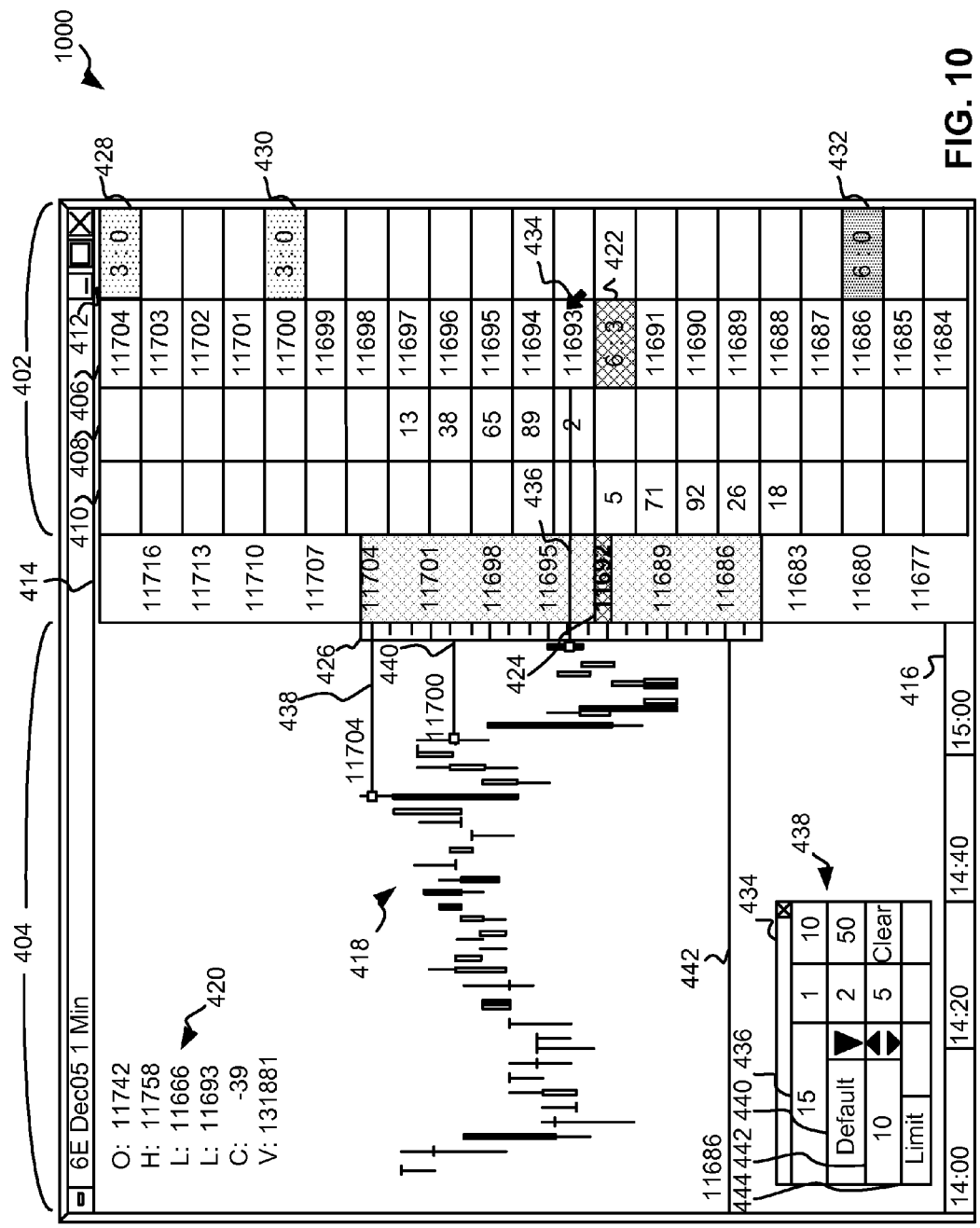

SYSTEM AND METHOD FOR A TRADING INTERFACE INCORPORATING A CHART

CROSS-REFERENCE TO RELATED APPLICATIONS

This application is a continuation of U.S. patent application Ser. No. 11/321,228 filed Dec. 29, 2005, entitled "System and Method for a Trading Interface Incorporating a Chart," now U.S. Pat. No. 7,711,631, the contents of which is fully incorporated by reference herein.

TECHNICAL FIELD

The present invention is directed to electronic trading. More specifically, the present invention is directed towards a system and method for trading interfaces in an electronic trading environment.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions.

Electronic trading is generally based on a host exchange, one or more computer networks, and client devices. In general, the host exchange includes one or more centralized computers to form the electronic heart. Its operations typically include maintaining an exchange order book that records unexecuted orders, order matching, providing price and order fill information, and managing and updating a database that records such information. The host exchange is also equipped with an external interface that maintains uninterrupted contact to the client devices and possibly other trading-related systems.

Using client devices, traders link to the host exchange through one or more networks to trade tradeable objects. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

A client device is a computer such as a personal computer, laptop computer, hand-held computer, and so forth that has network access. A network is a group of two or more computers or devices linked together in any fashion, which may be characterized by topology, protocol, and architecture. For example, some market participants may link to the host through a direct network connection such as a T1 or ISDN. Some participants may link to the host exchange through direct network connections and through other common network components such as high-speed servers, routers, and gateways that allow a trader to connect to an electronic exchange. The Internet, a well-known collection of networks and gateways, can be used to establish a connection between the client device and the host exchange. There are many different types of wired and wireless networks and combinations of network types known in the art that can link traders to the host exchange.

Sometimes, on their machines, traders use automated or semi-automated trading tools, collectively hereinafter referred to as automated tools, that automatically or semi-automatically send orders for tradeable objects to the exchange. Many different trading tools are usually provided to, among other things, facilitate fast and accurate order entry. For instance, an automated or semi-automated tool might quickly calculate one or more order parameters, such as order price or order quantity, based on market conditions, or some other reference condition, and then automatically send an order with these parameters to an exchange for matching.

To profit in electronic markets, market participants must be able to assimilate large amounts of data in order to recognize market trends and to view current market conditions. However, trying to figure out why market participants are buying or selling can be very difficult. Traders often use charts to analyze and predict market movements. However, while chart patterns may put buying and selling activities into perspective by providing a concise picture of the two activities as a tool to analyze markets, it may be too time consuming for a trader to switch back and forth between a trading interface and one or more chart application interfaces. Also, charts and trading interfaces often use different scales, such as when a chart displays more price levels to show the entire chart range, which may make it difficult for a trader to relate and analyze data displayed on the chart and the corresponding trading interface. Thus, it would be beneficial to provide a trading interface that would simultaneously assist a trader in making trading decisions and analyzing market conditions, while also allowing a trader to enter order in a fast and accurate manner.

BRIEF DESCRIPTION OF THE DRAWINGS

Example embodiments are described herein with reference to the following drawings, in which:

FIG. 10 is a block diagram illustrating a trading interface that is used to describe order entry methods according to example embodiments;

DETAILED DESCRIPTION

I. Overview

Example systems and associated methods described below provide a trading interface that includes an integrated market grid region and a chart region that can be simultaneously used for order entry and market analysis. According to one example embodiment, the chart region displays historical market data corresponding to a tradeable object, where the historical market data is mapped to a first plurality of values along a first value axis being used in relation to the chart region. The market grid region is displayed in alignment with the chart region, and it comprises a plurality of areas for receiving commands from a user input device to send trade orders to an electronic exchange. More specifically, the areas in the market grid region correspond to a second plurality of values along a second value axis, with the second plurality of values being an adjustable subset of the first plurality of values. According to one example embodiment, the market grid region may be modified by adjusting the second plurality of values along the second value axis according to a user input such that the second plurality of values now corresponds to a different subset of the first plurality of values than before the modification. Also, according to one example embodiment, the chart region may include a graphical indicator that represents the second plurality of values being used in the market grid region so that a trader can easily tell the position of the second plurality of prices in relation to the first plurality of values being used for the chart region. With the use of the graphical indicator, the second plurality of prices may be adjusted to correspond to the different subset of the first plurality of values by moving the graphical indicator relative to the first value axis.

While the example embodiments are described herein with reference to illustrative embodiments for particular applications, it should be understood that the example embodiments are not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. A First Example Trading System

Figure 1:
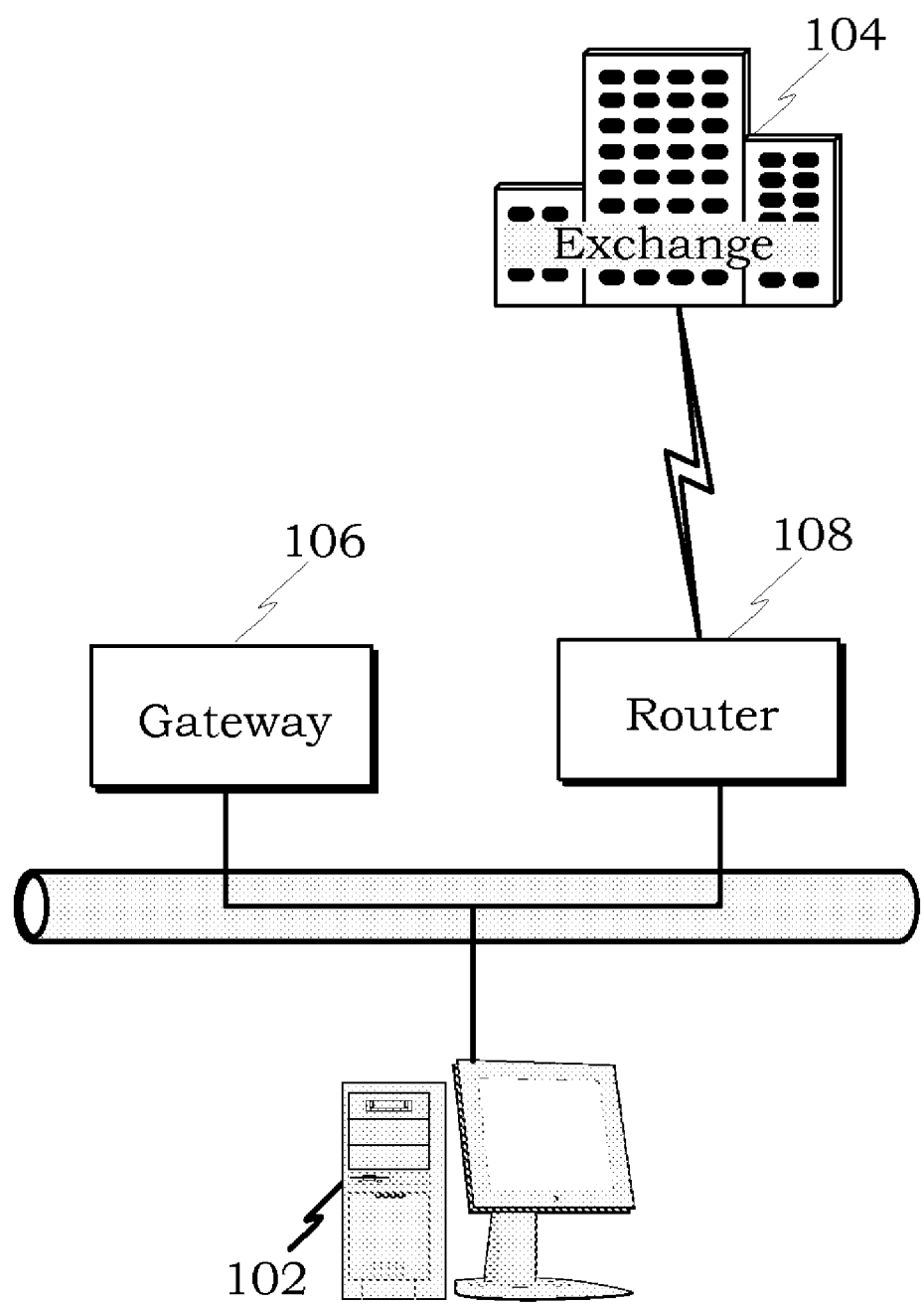
FIG. 1 illustrates a trading system for electronic trading according to an example embodiment, wherein the trading system includes a trading station where a trader can submit bids and offers for a tradeable object being traded at an electronic exchange.

FIG. 1 illustrates an example electronic trading system in which the example embodiments may be employed. In this example, the system comprises a trading station 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the trading station 102 with orders from other trading stations (not shown). The electronic exchange 104 may list one or more tradeable objects for trading. While not shown in FIG. 1 for the sake of clarity, the trading system may include other devices that are specific to the client site like middleware and security measures like firewalls, hubs, security managers, and so on, as understood by a person skilled in the art.

Regardless of the type of order execution algorithm used, the electronic exchange 104 provides market information to the subscribing trading station 102. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. In other words, an exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, the exchange 104 can offer other types of market information such as the last traded price (LTP), the last traded quantity (LTQ), and order fill information.

The computer employed as the trading station 102 generally can range from a hand-held device, laptop, or personal computer to a larger computer such as a workstation and multiprocessor. An illustrative personal computer may use Pentium™ microprocessors and may operate under a Windows operating system, or yet may use some other microprocessor or operating system. Generally, the trading station 102 includes a monitor (or any other output device) and an input device, such as a keyboard and/or a two or three-button mouse to support click based trading, if so desired. One skilled in the art of computer systems will understand that the present example embodiments are not limited to any particular class or model of computer employed for the trading station 102 and will be able to select an appropriate system.

The computer employed as the gateway 106 generally can range from a personal computer to a larger computer. An illustrative gateway 106 computer may use Pentium™ microprocessors and may operate under a Windows (server or workstation) operating system, or yet some other system. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a trading station or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

It should also be noted that the trading station 102 generally executes application programs resident at the trading station 102 under the control of the operating system of the trading station 102. Also, the gateway 106 executes application programs resident at the gateway 106 under the control of the operating system of the gateway 106. In other embodiments and as understood by a person skilled in the art, the function of the application programs at the trading station 102 may be performed by the gateway 106, and likewise, the function of the application programs at the gateway 106 may be performed by the trading station 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means besides a T1, T3, or ISDN.

In yet another example illustration, the gateway may be housed at, or near, its corresponding electronic exchange. According to this instance, the trading station may communicate with the gateway over a wide area network or through the use of a T1, T3, ISDN, or some other high speed connection.

In another example illustration, the gateway may be located remote from the trading station and remote from the electronic exchange, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

III. A Second Example Trading System

Figure 2:
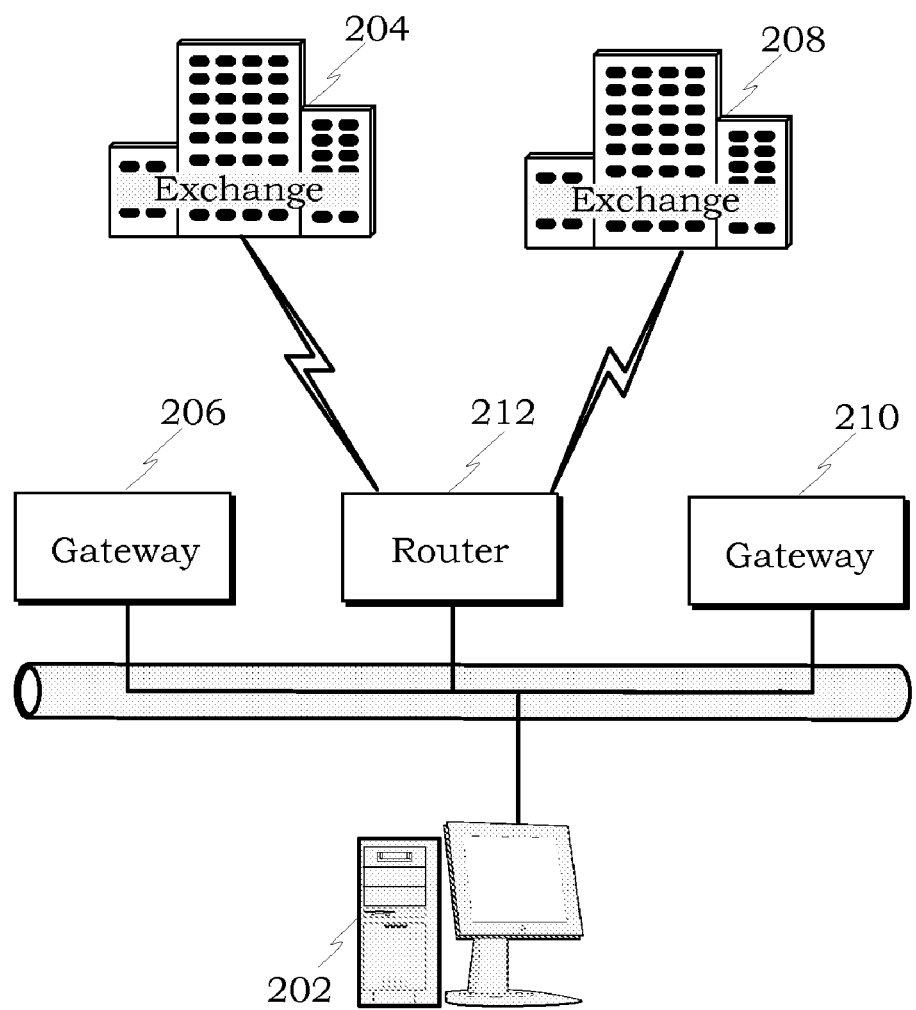
FIG. 2 illustrates another trading system for electronic trading according to another example embodiment, wherein the trading system includes a trading station where a trader can submit bids and offers for a tradeable object being traded at more than one electronic exchange.

FIG. 2 illustrates another example trading system that uses similar computer elements as shown in FIG. 1, in which, the example embodiments may be employed to trade at multiple electronic exchanges. The system comprises a trading station 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradeable objects listed at different electronic exchanges. To some traders, there can be many advantages with a multi-exchange environment. For example, a trader could view market information from each tradeable object through one common visual display. As such, price and quantity information from the two separate exchanges may be presented together so that the trader can view both markets simultaneously in the same window. In another example, a trader can spread trade different tradeable objects listed at the different electronic exchanges.

As indicated earlier, one skilled in the art of electronic trading systems will understand that the present embodiments are not limited to the particular configurations illustrated and described with respect to FIG. 1 and FIG. 2, and will be able to design a particular system based on the specific requirements (for example, by adding additional exchanges, gateways, trading stations, routers, or other computers serving various functions like message handling and security). Additionally, several networks, like either of the networks shown in FIG. 1 or FIG. 2, may be linked together to communicatively access one or more electronic exchanges.

IV. Graphical User Interfaces

The example embodiments described below include graphical user interfaces that provide intuitive order entry mechanisms along with customizable analytical tools that can display charts to help a trader make more informed trading decisions. More specifically, one example graphical interface includes a market grid region displayed along a chart region. The interfaces that will be described in greater detail below assist minimize the amount of user action when placing and modifying orders via a trading interface. The interfaces also allow a trader to confidently position orders relative to price levels or any other values in the market grid region as well as in relation to any chart patter(s) in the chart region. Furthermore, the graphical interfaces, as will be described in relation to the examples below, identify chart locations that were pertinent to the order placement decisions. The interfaces also solve the issue that charts of various longer time frames require wide price axis range to accommodate the displayed chart bars, but order entry and order management require very specific and precise price levels. As will be described in greater detail below, the order entry mechanisms provided by the graphical user interface are enhanced by visually tying values, such as prices, being used at the market grid to the values, such as prices, being used in the chart region.

Figure 3:
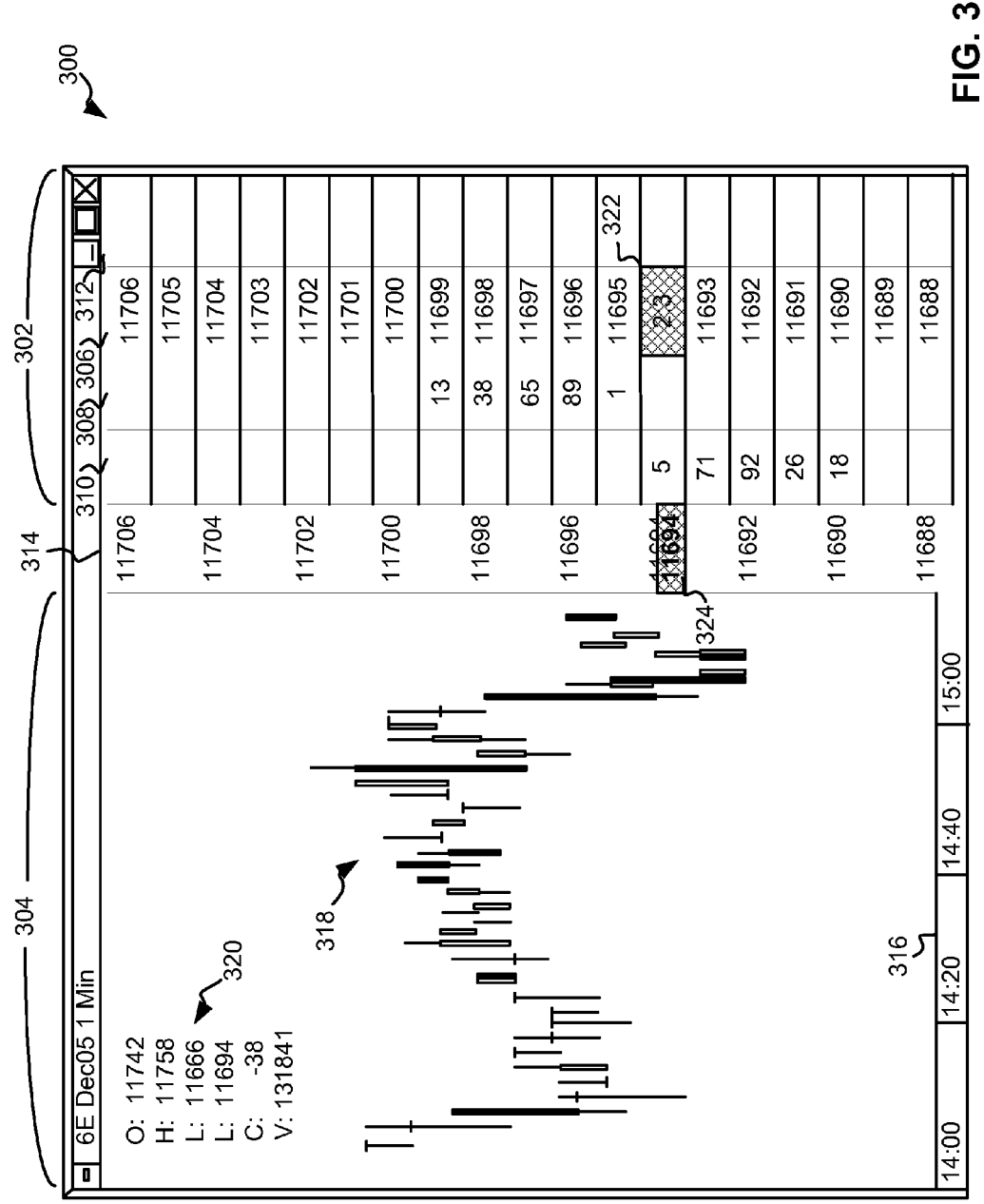
FIG. 3 is a block diagram illustrating a trading interface according to one example embodiment.

FIG. 3 is a block diagram illustrating a trading interface 300 according to one example embodiment.

The trading interface 300 includes a market grid region 302 and a chart region 304. The example market grid region 302 includes a value axis 306 that indicates values representing prices or some other derivative of price, such as yield, determined for a tradeable object being traded via the interface 300. The prices or some other derivatives of price for the tradeable object are determined based on market data being received from one or more electronic exchange. While the values in the value axis 306 are displayed along a vertically oriented axis, the values may be displayed along a horizontally oriented axis or along an axis positioned at some other angle. Once the value axis 306 is generated, quantity information contained in the market data feed corresponding to the tradeable object is used to populate the display against the value axis 306. As new quantity and price information arrives from the electronic exchange, the trading interface 300 is preferably updated to reflect any market changes.

The trading interface 300 includes an ask quantity column 308 and a bid quantity column 310 that display ask and bid quantities, respectively. The bid and ask quantities are displayed in the locations that correspond to their respective value, such as price levels, along the value axis 306. By looking at the trading interface 300, the trader can quickly locate the inside market, which refers to the highest bid price and the lowest ask price currently available for the tradeable object, which in the example shown in FIG. 3 correspond to prices "11694" and "11695," respectively. Further, using the trading interface 300, a trader can view how much quantity is available at various price levels. For example, following the best bid and the best ask, there is a bid quantity of "71" at the price level of "11693," and an ask quantity of "89" at a price level of 11696. Other levels of market depth are also shown, as illustrated in FIG. 3.

The trading interface 300 also shows additional parameters, such as a working quantity column 312 that may include working buy/sell order indicators for any pending working orders. The working order indicators may be displayed in the cells corresponding to prices at which the working orders are pending, and could include a value corresponding to a quantity of a working order. However, different indicators could be used as well.

The market grid region 302 also includes a last traded quantity indicator 322 that displays the last traded quantity information. The last traded quantity indicator 322 includes two numerical values, "2:3," with the first value corresponding to the last traded quantity and the second value corresponding to the accumulated last traded quantity at the price level at which the indicator 322 is displayed, here, the price level of "11696." It should be understood that the information provided in relation to the indicator 322 is not limited to that shown, and only a single value corresponding to the last traded quantity could be provided instead. Also, while the indicator 322 is displayed directly on the value axis 306, it should be understood that the indicator could be displayed in different locations in the market grid region 302 as well, such as in the working order column 312, or yet the cells corresponding to the last traded price could be highlighted across all columns. Alternatively, the market grid region 302 could include a traded quantity column that could display the quantity values that were traded at different price levels. In such an embodiment, the indicator 322 could be displayed in the last traded quantity column in a cell corresponding to the last traded price. In addition to the last traded quantity indicator 322, the chart region 304 also displays a separate last traded price indicator 324 enabling a trader to quickly access the last traded price without looking at the market grid region 302.

It should be understood that the market grid region 302 is not limited to the illustrated columns and indicators, and additional features in relation to the market grid region 302 could be provided as well based on the trader's preferences and settings. For example, the interface 300 could include additional indicators such as a delete all orders ("Del All") indicator, and a clear all "CLR" indicator that could enable a trader to clear order related parameters, such as a preset order quantity, or yet some other parameters. Additionally, a user could move the columns on the graphical interface 300 based on the user's preferences.

As the market conditions of the tradeable object change, the bid and ask quantity indicators in the bid quantity column 310 and the ask quantity column 308 move relative to the value axis 306. Thus, a trader can easily tell, among many other things, if the market has moved up or down. A trading screen similar to the market grid region 302 shown in relation to the trading interface 300 is commercially available as MD Trader™ in the X_TRADER® product offered by Trading Technologies International, Inc. of Chicago, Ill. Further, various aspects of the market grid region 302 in FIG. 3, including the dynamic movement of the bid and offer indicators against an axis, are described in U.S. Pat. No. 6,772,132. Adjustable viewing of the axes, including the consolidation of price levels and quantities, is described in U.S. Pat. No. 7,127,424. A variety of trading tools that can be used with the trading screen to assist in visualizing the market are further described in U.S. Pat. No. 7,389,268. The entire content of each of the above-referenced patents is incorporated herein by reference.

The intuitiveness of the example market grid 302 shown in FIG. 3 results from the dynamic display of quantities shown in the bid column 310 and ask column 308 positioned along the value axis 306. Locations in alignment to the values along the value axis 306 are, in essence, fixed in relation to the value levels. For example, a location in the ask column 308 (referring to a location within the area that displays the current quantity of "89") continues to correspond to the price of "11696," even if the market changes, thereby allowing a trader to get his intended price (order entry is described below). Similarly, a location in the bid column 310 (referring to a location within the area adjacent to the cell that displays the quantity of "89") continues to correspond to the price level of "11696," even when the market changes. While the locations in the bid and ask columns are shown horizontally to the location of the corresponding price level, different embodiments are possible as well. For example, the locations corresponding to a specific price level could be positioned at some angle. As the market climbs up or down in value, the user can quickly view the change since the indicators in the bid and ask quantity columns 310 and 308 will move up or down, respectively, along the value axis 306 to reflect the market change.

Now, turning to the second region of the interface 300, the chart region 304 includes a second value axis 314 and a time axis 316 to be used as references for displaying any user-selected chart. It should be understood that a trader could change a time period that is used in relation to the chart region 304 to view a larger number of bars of the chart 318. The value axis 314 shown in FIG. 3 is a price axis; however, different embodiments are possible as well. The price levels displayed in relation to the value time axis 316 relate to the prices displayed in relation to the value axis 306 in the market grid region 302. More specifically, the example shown in FIG. 3 illustrates a one-to-one relationship between the prices displayed on the value axes 314 and 306, with the middle portion of each cell in the market grid region 302 being substantially aligned with the equivalent price level displayed in relation to the value axis 314. As will be described in greater detail in relation to subsequent Figures, the value axis 308 in market grid region 302 could display a subset of the prices that are visible on the value axis 314, while still maintaining a relationship between the two regions and allowing for the intuitive order entry mechanisms.

While the chart region 304 in FIG. 3 displays a chart 318 that represents historical market data corresponding to the tradeable object selected for trading, it should be understood that more than one chart corresponding to more than one tradeable object could be displayed as well. Also, while one example chart format is shown in FIG. 3, it should be understood that the example embodiments are not limited to any specific chart type. For example, the chart 318 could be a line chart, a bar chart, a candlestick chart, or yet some different chart type. In another alternative embodiment, rather that displaying a chart, the chart region 304 could display a market profile corresponding to the tradeable object. A market profile is a statistical display of price activity over a specified time interval, with different letters being used to represent a time price opportunity-a specific half-hour time segment, or any other time interval, in which that price occurred on a specific day.

As will be described in greater detail below, when a trader submits an order for the tradeable object, a working order indicator could be displayed on the chart 318. The format of the working order indicator displayed on the chart 318 could change depending on the status of the order. For example, different colors could be used to indicate a successful receipt of the order at an exchange, a partial or full fill of an order quantity corresponding to the order, or yet some other order related event. It should be understood that the indicators used on the chart could be user-configurable. Also, in addition to automatically displaying indicators on the chart to indicate orders that were submitted by a trader, the trader could also manually mark other points of interest on the chart. It should be understood that a trader could control what data is plotted on the chart.

In addition to, or instead of displaying charts, the chart region 304 can display technical studies, such as the Moving Average Convergence/Divergence study, the Keltner Channel study, the Price Channel study, the Bollinger Band Difference study, or yet some other user configured studies. Also, a trader could perform any technical studies on the displayed charts, such as studies that would search for certain market data patterns and alert a trader when the desired pattern is likely to occur.

The interface 300 also displays historical market data 320 corresponding to the tradeable object. The historical market data 320 includes an opening price "O" at 11742, a highest traded price "H" during a trading session at 11758, a lowest traded price "L" at 11666, the last traded price "L" at 11694, a price change "C" of −38, and a traded volume "V" of 131841. While the interface 300 displays the historical market data 320 using numerical values, it should be understood that some or all of the data points could be shown using indicators displayed directly on the chart, and others could be displayed in the market grid region 302 and the chart region 304, such as the last traded quantity indicator 322.

While the one-to-one relationship between the price levels displayed on the value axis 314 corresponding to the chart region 304 and the value axis 306 in the market grid region 302 can be beneficial to a trader, in certain circumstances, the trader may wish to view a larger price range corresponding to the chart. This situation typically arises when a range of prices corresponding to historical market data displayed via the chart is larger than a range of prices that a trader wishes to have displayed on the value axis 306 in the market grid region 302, while the trader still wishes to have the full view of the highest and lowest price points on the chart. While it is possible to change a range of prices corresponding to both value axes and to maintain the one-to-one relationship, such a solution would not be very practical with a large number of price levels. More specifically, as the number of price levels to be displayed in relation to the value axis 306 increases, the height of each price cell and other cells corresponding to each price value would have to get smaller and smaller to the point where it would be difficult, if not impossible, for a trader to select each price or quantity cell to enter orders using the market grid portion of the interface 300, the embodiments of which will be described in greater detail below. Also, while a trader may wish to view a large number of price levels in relation to the chart, an exchange may only provide a limited number of market depth levels to be displayed in the market grid region 302, thus, making the display of large number of price level not even that useful to the trader.

According to the example embodiments that will be described in greater detail below, the market grid cells in the market grid region 302 are visually tied to the price levels in the chart region, and the number of price levels displayed in the market grid region may be smaller than the number of price levels corresponding to the chart region. As will be shown in subsequent figures, the range of prices displayed in the market grid region 302 may be represented by an indicator, hereinafter referred to as a slider that could be displayed in relation to the price axis corresponding to the chart region 304. The slider could be moved around the price axis corresponding to the chart to change the range of visible price levels in the market grid region 302. Also, the size of the slider may be changed to display a larger or smaller number of price levels in the market grid display region 302.

According to one example embodiment, the slider functionality of the trading interface could be activated automatically upon detecting a predefined minimum height of price cells as a trader increases the number of visible price cells in the market grid region 302. For example, a trader could increase the number of visible price levels in the market grid region 302. According to one example embodiment, a trader could drag the price scale downward by left clicking on any cell boundary line, indicating that the displayed price values should become closer together, thereby showing additional price levels. Alternatively, a right-click mouse context menu may offer scaling options, such as "Auto," which, when selected, may automatically re-size the scale on the value axis 308 to fit all data points displayed in the chart region 304 within the upper and lower boundary of the market grid region 302, thus, causing the value axis 308 to fit the maximum number of value levels or a lower number of value levels on the value axis 308, depending on the chart's coverage. Further, alternatively, a trader could select a "Manual" selection option that would enable a trader to manually enter a desired range of prices to be displayed in relation to the value axis 308 in the market grid region 302. As the number of the displayed cells in the market grid window reaches a predefined maximum, it is preferable that no additional cells will be displayed, and a slider will appear in the chart region 304, such as in relation to the value axis 314, as shown in FIG. 3. It should be understood that the maximum number of cells that can be displayed in relation to the price axis 308 could vary based on the size of the window corresponding to the interface 300.

According to another embodiment, a slider may be automatically activated when a trader increases a range of prices to be displayed on the value axis 314 in the chart region 304, while keeping the preferred maximum number of price levels displayed in relation to the market grid region 302. To illustrate these features, a few example embodiments of the slider functionality will be described in reference to subsequent figures. While the figures below show one specific configuration of a slider, it should be understood that the format of a slider could be user-configurable. Also, it should be understood that a slider could be positioned in the example trading screen at any location based on the user-configured settings, and the example embodiments are not limited to the layouts shown below.

Figure 4:
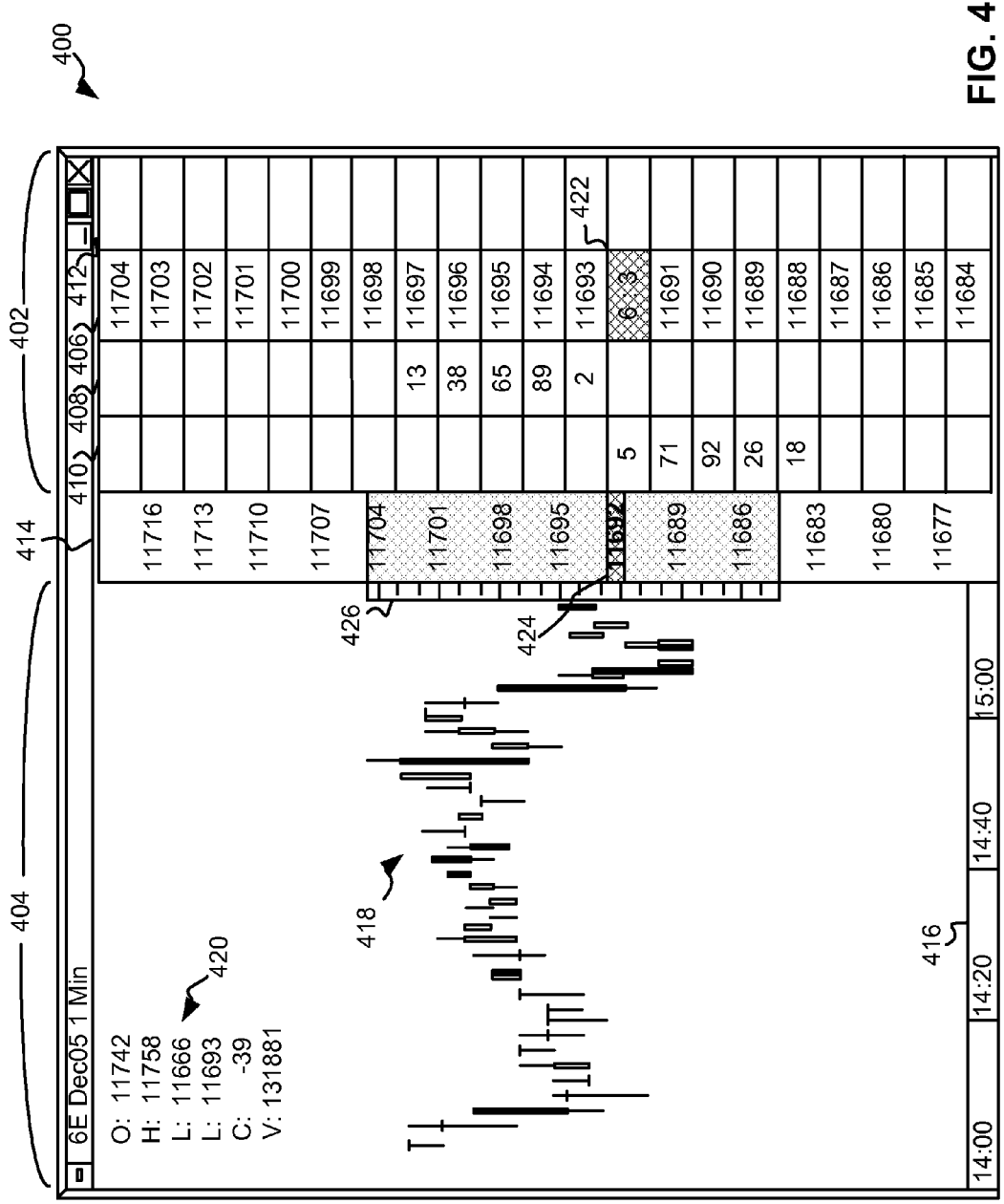
FIG. 4 is a block diagram illustrating a trading interface that uses the slider functionality according to one example embodiment.

FIG. 4 is a block diagram illustrating a trading interface 400 that uses the slider functionality according to an example embodiment.

Similarly to the trading interface in FIG. 3, the trading interface 400 includes a market grid region 402 and a chart region 404. The market region 402 displays a value 406, an ask column 408, a bid column 410, and a working order column 412. The chart region 404 includes a value axis 414, a time axis 416, a chart 418, and historical market data 420.

The interface 400 also includes the last traded quantity indicator 422 and the last traded price indicator 424.

While the interface 400 may look similar to that shown in FIG. 3, the range of prices displayed in relation to the value axis 414 encompasses a larger number of price levels as compared to that corresponding to the value axis 314 of FIG. 3. More specifically, the range of price levels on the value axis 414 is "11716-11677," while the range of price levels on the value axis 314 was 11706-11688. Since displaying the same number of price levels on the value axes 406 would exceed the maximum number of price cells defined for the market grid region 402 based on the current size of the window, the interface 400 displays a slider 426 to visually relate the price range in the market grid region 402 to the price range displayed on the value axis 414. More specifically, the slider 426 is displayed in relation to the value axis 414. As shown in FIG. 4, the size of the slider 426 is proportional to the range of prices in the market grid region 402 relative to the visible price range on the price axis 414. Also, as shown in FIG. 4, the top level of the slider 426 is positioned at the price on the value axis 414 that is equal to the highest price level on the value axis 404, which in this example corresponds to the price level of "11704." Similarly, the bottom level of the slider 426 is positioned at the price level of "11684" that corresponds to the lowest price level displayed in relation to the price axis 406. While FIG. 4 illustrates a single indicator to represent a slider, it should be understood that more than one indicator could be used as well. For example, one indicator could be used to represent the lowest price in the market grid region 402, and another indicator could be used to represent the highest price in the market grid region.

A trader may further increase the number of price levels associated with the chart region 402 by selecting the value axis 414 of the chart region 404, entering a predetermined user selection input to activate the price scaling, and dragging the value axis 414 to increase the number of values displayed in relation to the value axis 414. According to one example embodiment, a user could rescale the value axis 414 of the chart region 404 by the left-mouse click dragging functionality within the chart region 404 or on the value axis 414. It should be understood that the value axis 414 could also automatically re-scale, such as, for example, to show all price levels corresponding to a trader's working orders. Also, the value axis 414 may be re-scaled based on the trading activity over a predetermined time frame.

Figure 5:
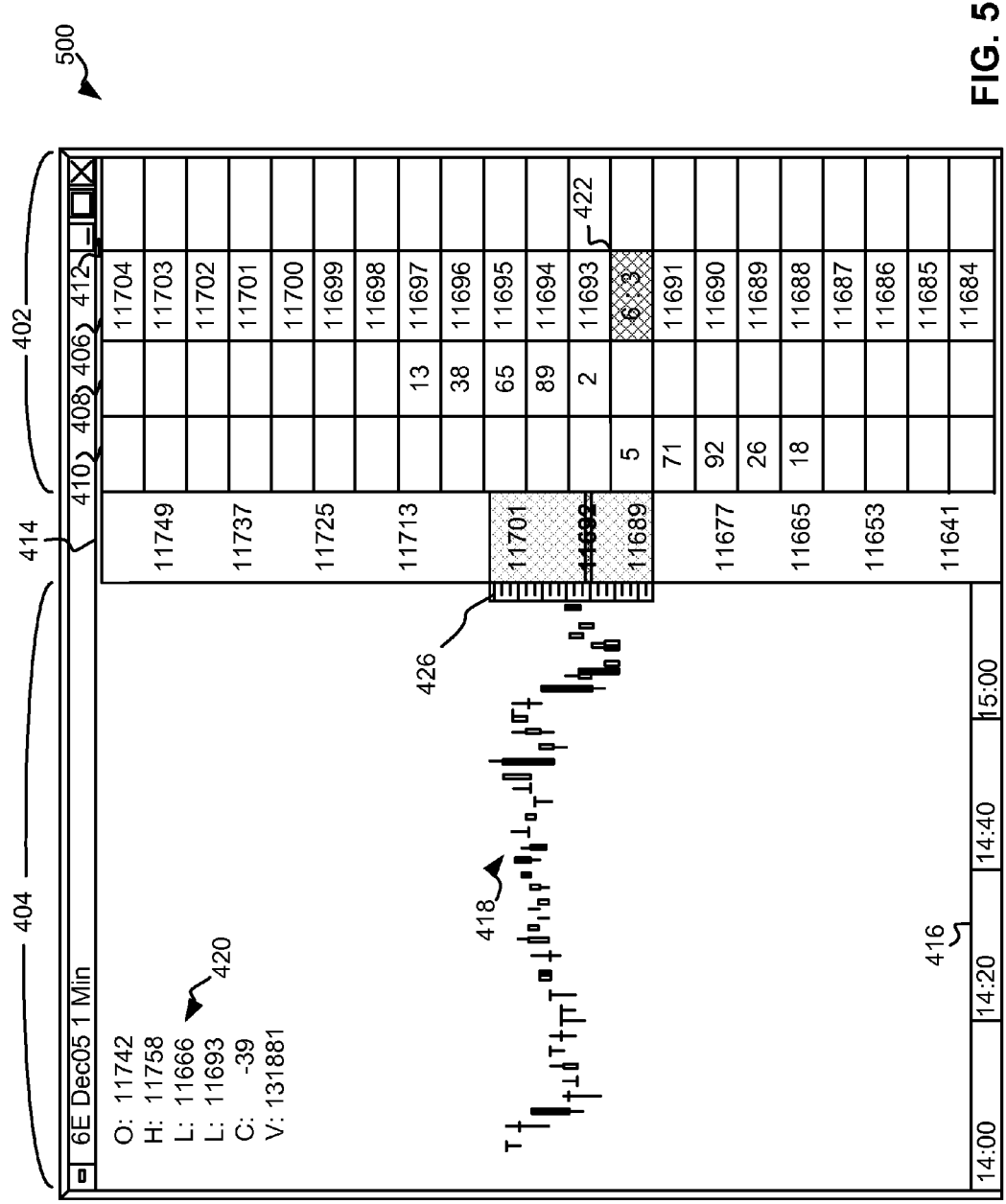
FIG. 5 is a block diagram illustrating a trading interface using the slider functionality, with a value axis in a chart region showing a large number of price levels.

FIG. 5 is a block diagram illustrating a trading interface 500 using the slider functionality, with a value axis in a chart region showing a large number of price levels. As shown in FIG. 5, the value axis 414 of the chart region 404 displays a range of prices between "11749" and "11641," as compared to the smaller range of prices shown in FIG. 4. Also, as the number of price levels displayed in the value axis 414 increases, the chart 418 "shrinks" respectively, as shown in FIG. 5. The length of the slider 426 also changes respectively to reflect the price range corresponding to the slider 426 as compared to the overall range of prices displayed on the value axis 414.

Figure 6:
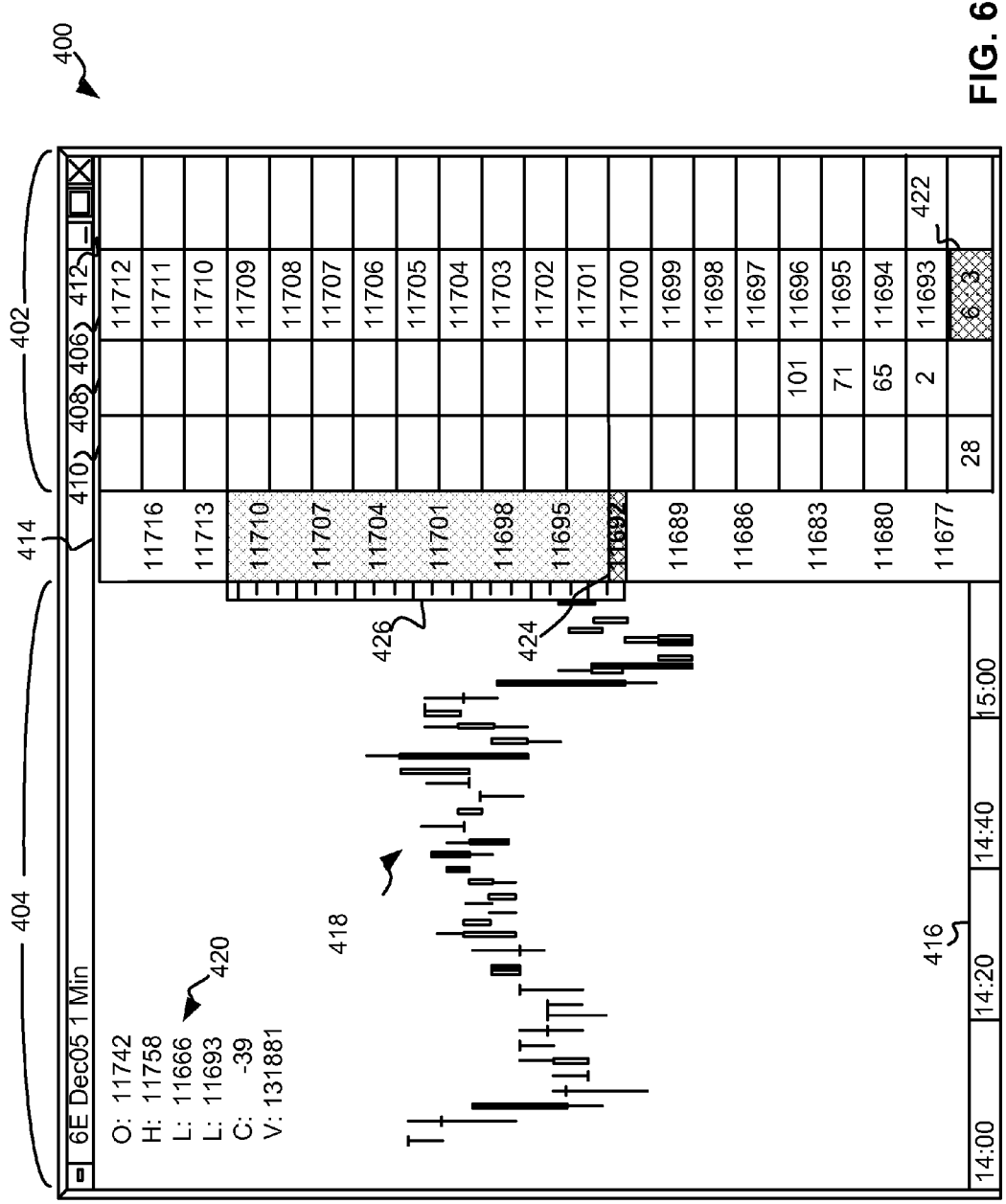
FIG. 6 is a block diagram illustrating a trading interface using the slider functionality with the slider repositioned up relative to a value axis in a chart region of the interface.

As mentioned earlier, a trader can change a price range displayed in the market grid region 402 by dragging the value axis 406 vertically up or down, or yet via some other means. Instead of manipulating the value axis 406, a trader could also use the slider 426 to change the range of price levels displayed on the value axis 406. FIG. 6 is a block diagram illustrating a trading interface 600 using the slider functionality with a slider repositioned up relative to a value axis in a chart region of the interface. More specifically, as shown in FIG. 6, the slider 426 has been re-sized such that the highest edge of the slider corresponds to the price level of 11712 on the value axis. When a trader repositions the slider 426, the price values displayed in relation to the value axis 406 change respectively. Based on the current position of the slider 426 shown in FIG. 6, the highest price level displayed on the value axis 406 shown in FIG. 6 corresponds to 11712, i.e., the price level corresponding to the highest edge of the slider 426. Similarly, since the lowest edge of the slider 426 corresponds to the price level of 11692 in FIG. 6, that price level corresponds to the lowest price level displayed on the value axis 406.

Figure 7:
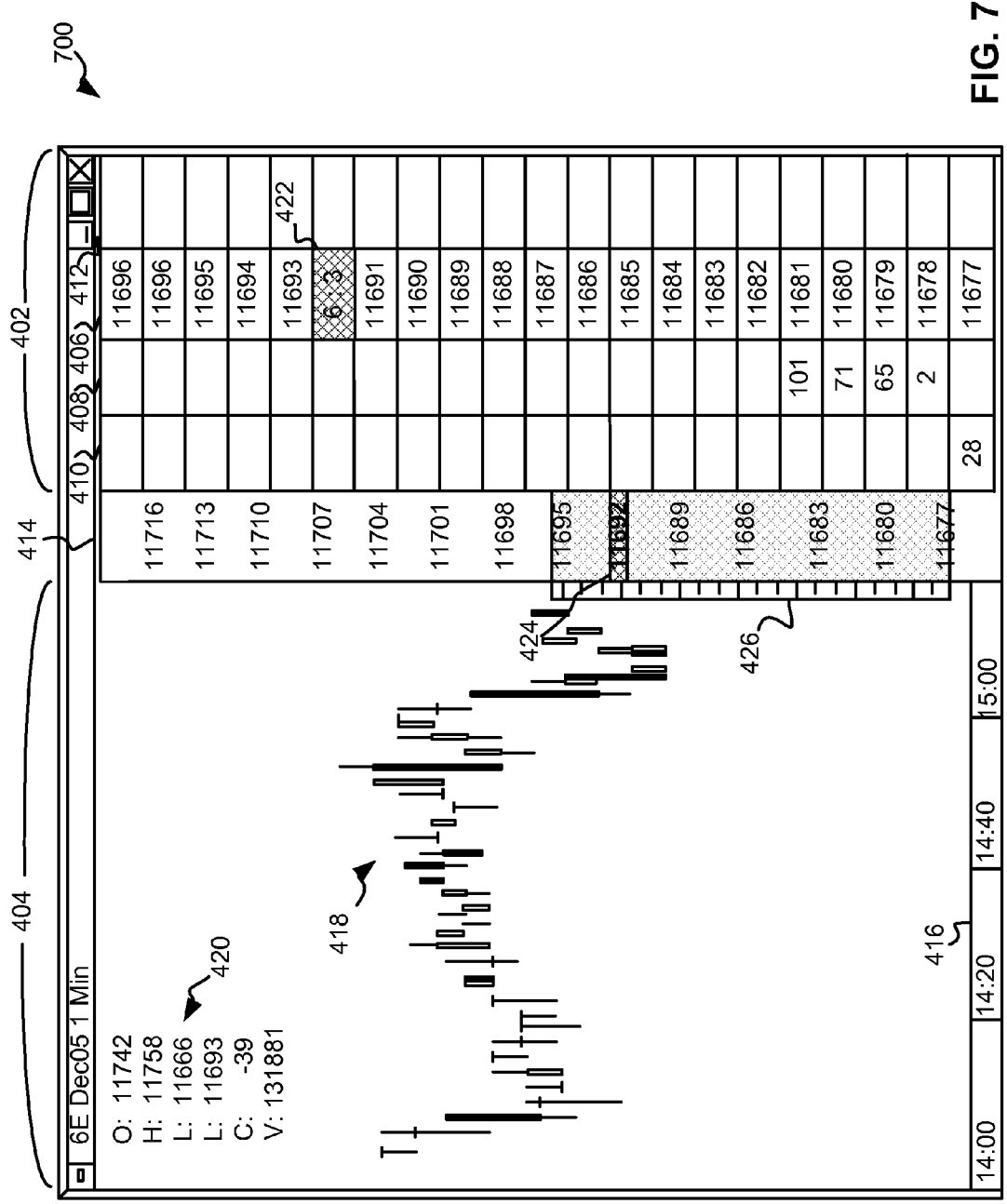
FIG. 7 is a block diagram illustrating a trading interface using the slider functionality with a slider repositioned down relative to a value axis in a chart region of the interface.

Rather than moving the slider 426 up along the value axis 414, a trader could also move the slider 426 down relative to the value axis 414. FIG. 7 is a block diagram illustrating a trading interface 700 using the slider functionality with a slider repositioned down relative to a value axis in a chart region of the interface. Based on the current position of the slider 424 shown in FIG. 7, the upper edge of the slider 424 corresponds to the price level of 11696, and the lowest edge corresponds to the price level of 11677. Once again, the range of price levels displayed in relation to the value axis 406 in FIG. 6 tracks the price range covered by the slider 426 on the value axis 414. Thus, in FIG. 7, the value axis 406 covers a price range between the price levels of 11696 and 11677, respectively.

A trader may also center the slider 426 relative to the value axis 414 that may in turn change a view of price levels displayed via the value axis 414. The re-centering of the slider 426 could be performed automatically upon detecting a predetermined user input, such as a middle mouse button click on the value axis 406 or upon detecting a specific keystroke command from the keyboard, such as the spacebar key, for example. It should be understood that the slider 426 could be centered on (or track) any user-defined value, such as a last traded price, or yet some other value determined based on a predefined algorithm. Also, re-centering command could be generated automatically based on any user-defined criteria. Upon detecting a re-centering command, the value axes 406 and 414 could be re-centered based on the predetermined value, and the chart 418 could be repositioned accordingly.

Figure 8:
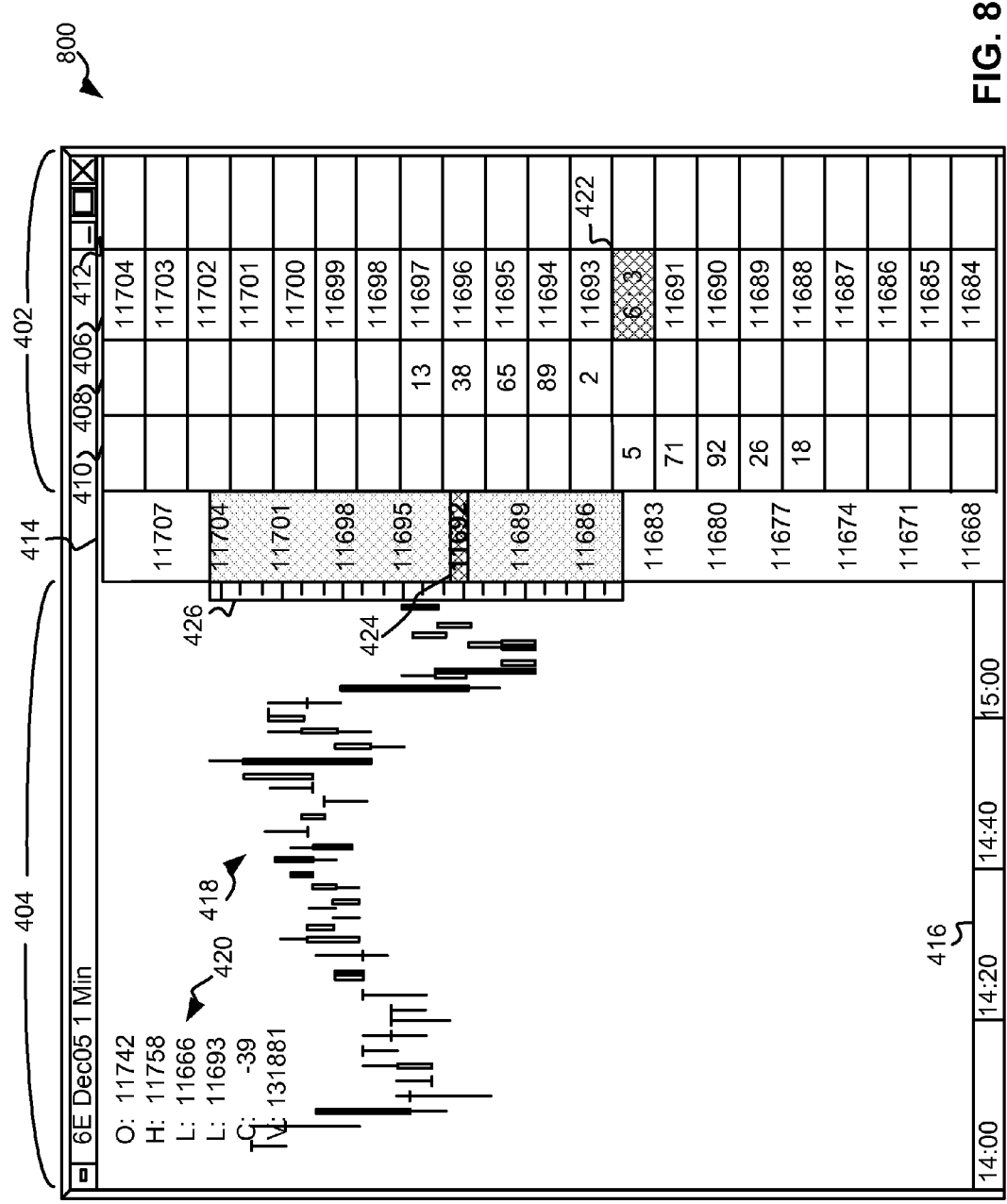
FIG. 8 is a block diagram illustrating a trading interface using the slider functionality with a chart repositioned relative to a value axis in a chart region.

A trader could also change the range of visible price levels on the value axis 414 by dragging the chart 418 vertically up or down. FIG. 8 is a block diagram illustrating a trading interface 800 using the slider functionality with a chart being repositioned relative to a value axis in a chart region. Compared to FIG. 4, the chart 418 in FIG. 8 has been moved up relative to the value axis 414 and is now positioned in the upper portion of the chart region 404. According to one example embodiment, as the chart 418 is moved up, such as for example, by selecting and dragging the chart 418 up with a user input device, the slider 426 is accordingly moved along the value axis 414 to maintain its relative position on the axis 414. While the chart 418 is being moved, the price range corresponding to the slider 426, as well as the price range displayed in relation to the value axis 406 in the market grid region 402, may remain constant, while the prices covered on the value axis 414 will change.

According to another example embodiment, a trader could also change the price tick spacing in relation to the value axis 414. In such an embodiment, the size of the slider 426 would be also adjusted to maintain at least the predefined minimum pixel spacing between the price levels displayed on the value axis 406 and the cell borders, so that the user can easily place orders in the market through the trading display. It should be understood that when the price tick spacing on the value axis 414 is increased enough to the point where a one-to-one relationship is restored between the price levels displayed on the value axes 414 and 406, the slider 426 would disappear from the value axis 414, and the one-to-one relationship between the prices on both axes would be restored.

Figure 9A:
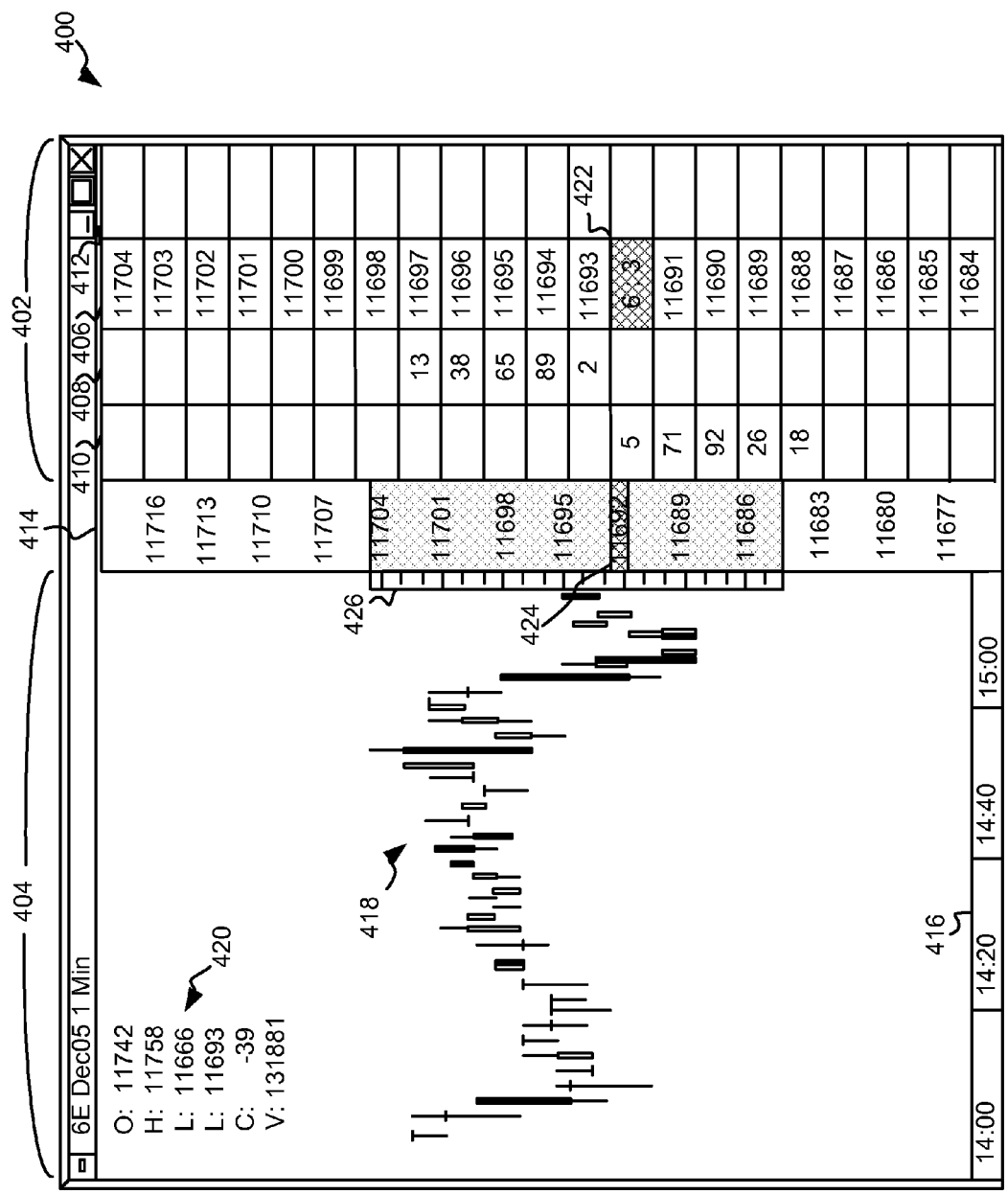
FIGS. 9A and 9B illustrate a graphical user interface, with the interface in FIG. 9A showing a value axis, and the value axis being hidden in the interface shown in relation to FIG. 9B.
Figure 9B:
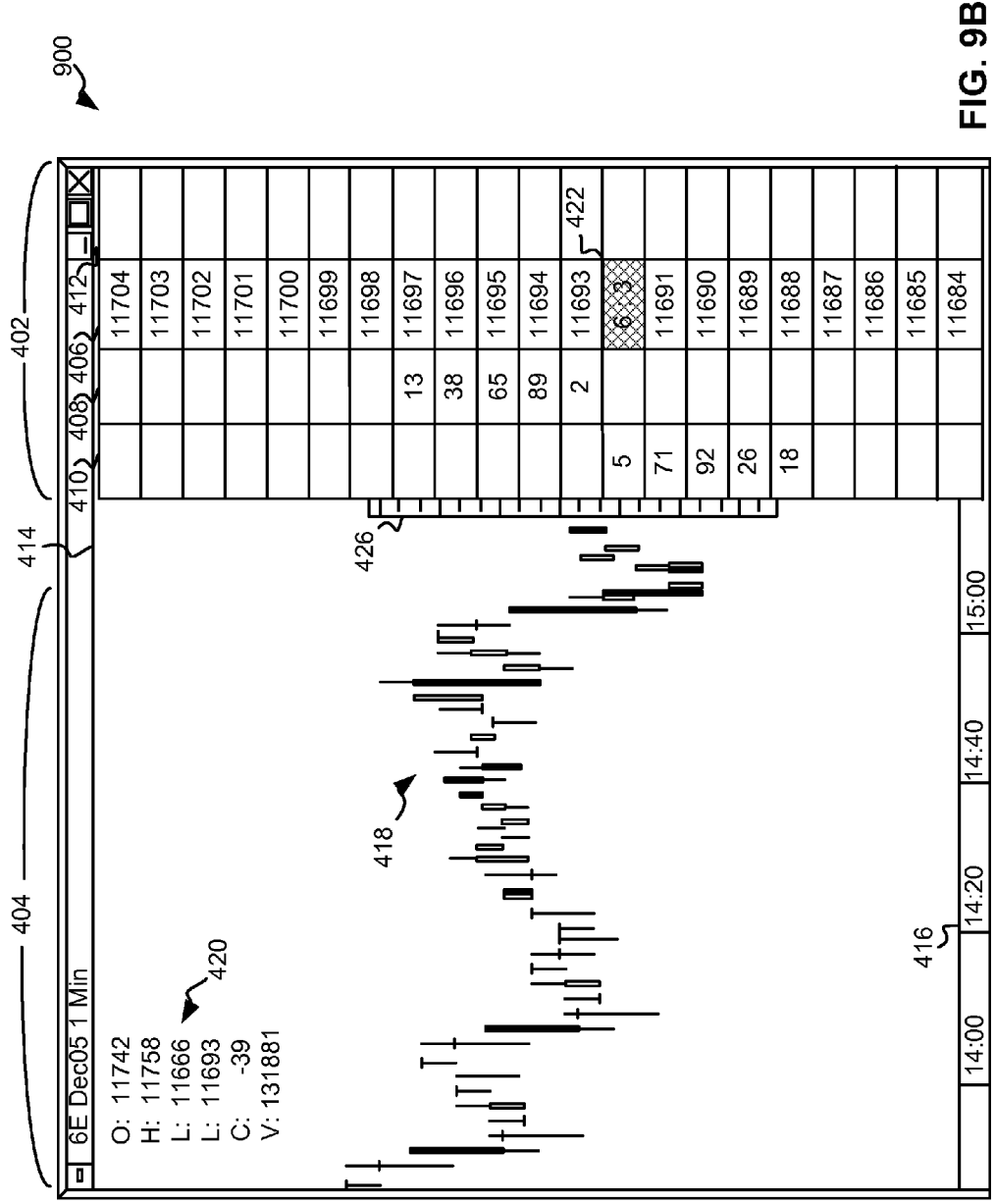

While the interface described in relation to the preceding Figures include two value axes, it should be understood that a trader could hide the value axis 414, such as when a trader wishes to view a longer time period on the time axis 416, thus, increasing the visible portion of the chart 418. FIGS. 9A and 9B illustrate the same graphical user interface 900, with the interface in FIG. 9A showing the value axis 414, and the value axis 414 being hidden in the interface shown in relation to FIG. 9B. While the interface in FIG. 9B does not display the value axis 414, the interface 900 still displays the slider 426 so that a trader can still view the relative positions of the price range displayed in relation to the value axis 406 to that of the price range currently being used in relation to the chart. While the slider 426 is displayed along the left side of the market grid region 402, it should be understood that the slider 426 could be positioned in a different area of the interface 900 based on user-defined preferences.

A. Order Entry Methods

FIG. 10 is a block diagram illustrating a trading interface 1000 that will be used to describe order entry methods according to example embodiments. The trading interface 1000 is similar to those described earlier and includes the market grid region 402 and the chart region 404, the features and functionality of which were described in greater detail above.

According to one example embodiment, to enter an order using the graphical interface 1000, a trader can preset a default order quantity and then use an input device to select a cell in the bid or ask columns 410, 408 corresponding to a desired price of the order. For example, if the cell in the bid column 410 associated with the price level of 11691 is selected, then a buy order having the default order quantity would be automatically entered and sent to an electronic exchange at which a tradeable object corresponding to the order is trading. According to one example embodiment, a trader could define a default order quantity via an execution control panel 434. The execution control panel 434 includes a net position field 436, a number of quantity buttons 438, which in this embodiment correspond to the quantities of 1, 2, 5, 10, and 50, an account selection box 440, a current default quantity box 442 with up/down arrows that allow to increase/decrease the default quantity, and an order type box 444. While the execution control panel 434 illustrates an example set of variables, it should be understood that additional or fewer variables could be provided as well. Also, the panel 434 could be movable and/or could be locked by a trader into a certain position.

Referring back to the order entry, when orders to buy or sell are entered via one of the market grid columns, working order icons, such as the ones at 428, 430, and 432, would then be displayed in the working order column 412. The working order icons 428 and 430 correspond to pending sell orders at prices 11704 and 11700, respectively, while the working order icon 432 corresponds to the a pending buy order at 11686. It should be understood that the working order indicators could be color coded to distinguish a pending working bid order from the pending working ask order. Also, the actual quantity corresponding to each working order could be displayed in relation to the working order indicators. In the example provided in FIG. 10, each working order quantity indicator displays a number corresponding to the working order quantity and a number corresponding to the quantity that was already filled at that price. For example, the working order indicator 432 displays "6:0," which indicates that the working order quantity of 6 is still pending in relation to the working order corresponding to the indicator 432, and no working order quantity has been filled. Similarly, for example, if a user had three 5-lot buy orders, the indicator would show 15:0. When one of the orders is fully filled, but the other two remain, the indicator 432 would display "10:0."

According to one example embodiment, a mouse input device could be used to position a cursor over a location in a cell of either the bid column 410 or sell column 408, and, upon selection of the mouse button (either upon the down stroke of the mouse button or upon release of the button, however programmed), an order to buy or sell may be submitted for processing by the trading application. Once the trading application processes the order, the order may be submitted to an electronic exchange. In the example embodiment described above, a trader could distinguish a buy order from a sell order by selecting a location in either the bid column 410 or the ask column 408, respectively. In another example embodiment, buttons on the input device could be programmed so that when a particular button is pressed, it sends a buy order, and when another button is pressed, it sends an ask order.

In yet another example embodiment, a keyboard may have keys that are associated with the price levels displayed on the graphical interface, and a trader could initiate an order by selecting the keys. It should be understood that before an order is sent to an exchange, different applications, such as a risk management tool, or yet some other application, could be programmed to process the order and prevent the order from being sent to the exchange if certain criteria occur.

According to one example embodiment, the trading interface 1000 allows a trader to actively correlate any order to be entered via the market grid region 402 with the associated price level on the chart 418 in the chart region 404. More specifically, for example, as a pointer corresponding to a user input device, such as a mouse, covers one of the price cells in the value column 408, the trading interface 1000 may automatically display an order line that can extend out to the left into the chart region 404. According to one example embodiment, the left end of the order line may display an order pointer box that could be displayed at a location of the first price bar nearest to the value axis 414 that the order line intersects. One example order line corresponding to a price level 11693 is displayed at 436, and the order line 436 is based on the current location of the mouse pointer 434. As the pointer 434 moves relative to the price cells displayed in relation to the value axis 406, the order line 436 can be respectively moved to a different location, with the order pointer box displayed in relation to a different bar corresponding to the current price level of the pointer 434. The order line as well as the order pointer box can be very helpful to a trader, since both features allow a trader to reference a price bar point that the trader deems significant to placing an order.

According to one example embodiment, when a trader uses a mouse as a user input device and moves a mouse cursor with respect to the value axis 406, the order line feature can be activated as long as the trader depresses the right mouse button. The release of the right mouse button may automatically cause placement of an order having a default order quantity. In such an embodiment, if the mouse button is released below the current inside market, a buy order could be placed, and if the mouse button is released above the inside market a sell order could be placed. Also, while in this mode of operation, a trader could escape placing an order by moving the mouse cursor out of the window boundary corresponding to the trading interface 1000, and then releasing the mouse button. Alternatively, a trader could escape the operation by hitting the Escape key, or yet some other key before releasing the right mouse button. While the example order line functionality has been described based on the movement of the mouse cursor in relation to the price cells in the value axis 406, it should be understood that the same functionality could be activated when the mouse cursor moves with respect to different locations in the market grid region 402. For example, the same functionality could be activated upon detecting mouse cursor movement with respect to the cells corresponding to the ask column 408 and the bid column 410.

Also, as shown in FIG. 10, working order lines corresponding to the trader's currently pending working orders could be displayed on the chart 418 as well, such as working order lines 438, 440, and 442, corresponding to working order indicators 428, 430, and 432, respectively. Similarly to the order line 436, a working order line could end with a working order box located at the rightmost intersection with a price bar, e.g., such that the working order line only extends to the first intersection with a price bar nearest to the value axis 414. For example, the working order line 440 corresponding to the working order indicator 430 at the price level of 11700 extends to the first price bar on the chart 418 that corresponds to the historical market activity at 11700.

According to one example embodiment, if a working order line or an order line does not intersect with any point of the chart 418 displayed in the chart region 406, such as, for example, when the order price is above or below the currently displayed visible bar on the chart 418, then the working order line or the order line can be displayed extending all the way to the left chart window border, with no pointer order box being displayed in the chart region 406. A working order line corresponding to such an embodiment is the working order line 442. Since the price corresponding to the working order indicator 432 does not correspond to any displayed price bar on the chart 418, the working order line 442 extends all the way to the left of the chart region 406. It should be understood that a trader could change a time period that is used in relation to the chart region 404 to view a larger number of bars of the chart 418. Alternatively, a trader could select any point on the time axis 416 and move the time axis to the right to view earlier portions of the chart 416. It should be understood that the order line and the working order lines could be color-coded based on user preferences. For example, different colors could be used to represent different order types, different order quantities, different accounts, or yet some other trader or order related parameters.

In addition to simply indicating the position of the orders with respect to the displayed chart 418, the working order lines could be used to change order parameters corresponding to the respective orders. For example, a trader could select a working order line and move it to a different location on the chart 418, thus, for example, changing a price level for the working order. In such an embodiment, movement of the working order line would respectively change the position of a corresponding working order indicator displayed in the market grid region 402 to reflect the updated order price. Upon detecting a change, a trading application could either send a change request to an electronic exchange for the pending order, or cancel the existing order and submit a new order request for an order at the new price level. It should be understood that the specific functionality may depend on the user configuration as well as the exchange settings.

While, according to one example embodiment described above, a trader can enter orders via the market grid region 402, it should be understood that the order entry methods could be provided with respect to the chart region 404 as well. In such an embodiment, rather than selecting a location corresponding to a desired price level in the market grid region 402, a trader could simply select a desired point on the chart 418 with a mouse cursor. To make the price selection via the chart region 404 more accurate, a price label could be displayed in relation to the mouse pointer as a trader moves the mouse pointer relative to the bars of the chart 418. In addition to displaying a price level in relation to the mouse pointer, the trading interface 1000 could display order lines. In such an embodiment, the order line could start at the current location of the mouse pointer in relation to the bar on the chart 418, and continue to the corresponding price level on the value axis 413, with an order box extending to the corresponding price level in the working order column 412, or yet some other column in the market grid region 402.

The process of determining whether an order entered via the chart region 404 is a buy or sell order could be based on many different criteria. According to one example embodiment, the determination can be made based on a price level associated with a location of the mouse pointer at the time when the order is placed. For example, if the mouse pointer is below the last traded price, a buy order could be assumed. However, different methods could be used as well. For example, different key, mouse click combinations, could activate placement of a buy order vs. a sell order. It should be understood that an order line that is displayed as the trader moves the mouse pointer to a price level below the last traded price could be color-coded to represent a buy order. For example, a blue order line could be displayed to indicate that an order is a buy order. Similarly, if the mouse pointer is above the last traded price, a sell order could be assumed, and a red order line could be displayed to indicate a possible sell order. According to one example embodiment, once a trader moves the mouse cursor to a desired price level in the chart region, the trader could simply left-click on the desired location to place an order having a preset default order quantity. However, different order entry methods could be used as well.

Once an order is placed via the chart region 420, a working order indicator could be displayed in the working order column 412 of the market grid region 402 in relation to the order price. Additionally or instead of displaying working order indicators in the working order column 412, working order indicators could be displayed in relation to the value axis 414 so that a trader could view working order indicators at price levels that are not visible via the value axis 406. It should be understood that the working order indicators could be color coded to distinguish between buy and sell orders, or yet based on different order related criteria, such as order types.

Further, alternatively, a trader could view order indicators directly on the chart 418, and different indicators could be used to show different order statuses, such as partial fills, how long an order has been pending at the same price, order modifications, such as changes in the orders' prices or cancellations, or yet some other order related status. Also, based on the user-defined settings, a trader could view trading activity in relation to the chart 418. In such an embodiment, fills, partial fills, cancellations, and other order changes could be displayed in relation to the chart 418, so that a trader could easily correlate each order-related activity with a specific time displayed in relation to the time axis 416. Also, order lines could be displayed in relation to working orders as long as there is at least a portion of an order quantity that has not been filled in association with each corresponding working order.

Figure 11:
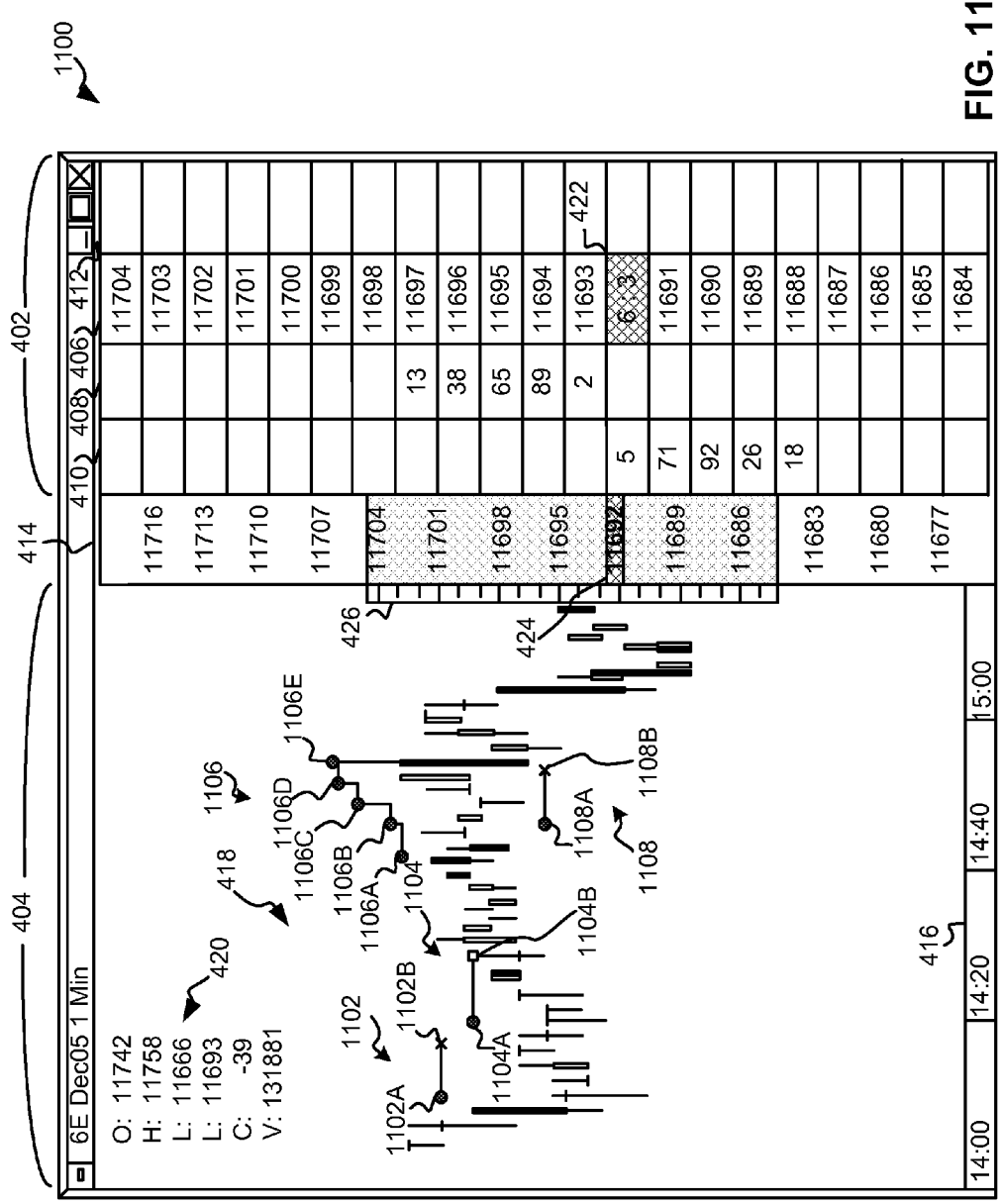
FIG. 11 is a block diagram illustrating a trading interface that is used to describe an example method for displaying order related activities relative to the market activity.

FIG. 11 is a block diagram illustrating a trading interface 1100 that will be used to describe one example method for displaying order related activities relative to the market activity. Four such order related activities 1102, 1104, 1106, and 1108 are displayed in relation to the trading interface 1100.

For example, a trader could review the order activities 1102 and 1108 to determine the time when the trader decided to enter each order, as represented here by indicators 1102A and 1108A, respectively, and when the trader decided to cancel each order, as represented by indicators 1102B and 1108B. As shown in FIG. 11, a trader can review the trading activity in relation to the chart 418, which allows the trader to gain a better understanding of his actions and possible trading mistakes.

As another example, the trading activity 1104 illustrates when a trader placed an order 1104A and when the order was filled, as shown at 1104B. Finally, the trading activity 1106 illustrates when a trader placed an order, as shown at 1106A, when the modifications of the order's price occurred, at 1106B, 1106C, and 1106D, and finally, when the order was filled, as shown at 1106E. It should be understood that the trading activities shown in FIG. 11 are only examples, and different order related actions could be shown as well. Also, a trader could control what icon should be used to represent a user-selected order activity status. While, the interface 1100 uses different icon shapes to represent different activity conditions, the icons could also be color coded to represent the activity conditions as well.

B. Strategy Order Entry and Display

In addition to entering single orders using the methods described above, a trader could also quickly enter and view trading strategies that may include a plurality of dependent orders, such as, for example, a trading strategy including two orders, where one of the orders will be sent only if there is a fill detected in relation to the second order. According to one example embodiment, the trading interfaces described above could include a trading strategy region that can be used by a trader to view and establish trading strategies, as will be shown in relation to the subsequent figure. The interface can include a toolbar with a plurality of icons that can be used by a trader to establish trading strategies. The icons can correspond to different order types, and the icons provided in the toolbar can be automatically selected based on order types provided by an electronic exchange in relation to a tradeable object selected by a trader for trading. The location of the icon in relation to the value axis and the current market conditions, such as the last traded price, could be used to determine if an order is a buy order or a sell order. Alternatively, different icons could be used to represent a buy order and a sell order.

According to one example embodiment, a trader could establish a trading strategy by positioning two or more order icons corresponding to a trading strategy in relation to a value axis of the market grid region 402, the chart region 404, or a trading strategy region, as will be illustrated below. The order icons corresponding to the trading strategy could be visually connected to represent a relationship between the orders. Visual means that can be used to connect the icons could, for example, include lines with arrows representing an execution priority corresponding to the orders. It should be understood that the visual means could take formats other than arrows to show the order execution priority, and any numerical or yet different indicator types could be used as well. Also, it should be understood that a trader could predefine graphical representations of trading strategies, and just move a desired representation of the trading strategy to one of the regions of the trading interface. In such an embodiment, a trader could move the individual icons corresponding to different orders in relation to the value axis to position each icon at the desired price level.

Figure 12:
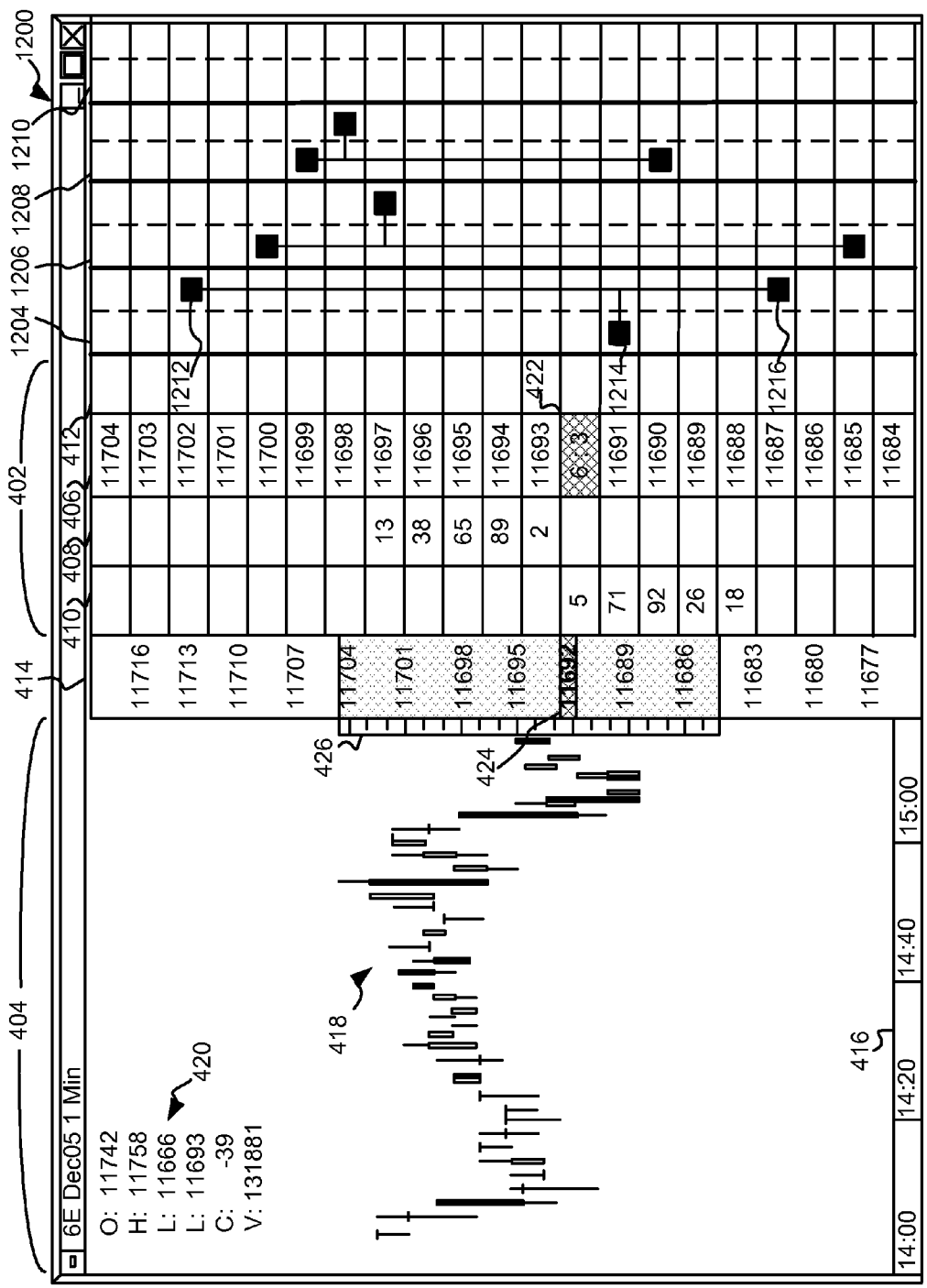
FIG. 12 is a block diagram illustrating a trading interface that is used to describe an example method for establishing and displaying trading strategies.

FIG. 12 is a block diagram illustrating a trading interface 1200 that will be used to describe one example method for establishing and displaying trading strategies.

Similarly to the previously described interfaces, the trading interface 1200 includes the market grid region 402 with the value column 406, the ask column 408, the bid column 410, and the working order column 412, as well as the chart region 404 with the value axis 414, the time axis 416, and the chart 418. In addition to the market grid region 402 and the chart region 404, the trading interface 1200 includes a trading strategy region 1202. The trading strategy region 1202 can be used by a trader to establish and or view trading strategies. The illustrated trading strategy region 1202 includes four columns 1204, 1206, 1208, and 1210, with the first three columns being used for displaying pending trading strategies, and the last one being used for establishing new trading strategies. According to the example embodiment illustrated in FIG. 12, each column in the trading strategy region is dedicated to a single multi-order trading strategy, with each column including sub-columns designated for buy and sell orders. In FIG. 12, each left sub-column corresponds to a sell order and each right sub-column corresponds to a buy order; however, it should be understood that the location of the columns could be reversed as well. Also, while the interface includes three trading strategy columns, fewer or more columns could be used as well depending on how many trading strategy a trader has pending at any moment.

The column 1210 can be used to establish new trading strategies. To do that a trader could use one or more order icons or pre-configured trading strategy icons. As mentioned earlier, different icon shapes could correspond to different order types or some other order related parameters. While a quantity corresponding to each icon could be based on a pre-configured default quantity, a trader could click on each icon to define a different order quantity, or yet some other order related parameters.

Also, while, according to one example embodiment, a trader can establish trading strategies via the trading strategy region 1202, trading strategies could be established by positioning trading strategy icons in the chart region 404 as well. In such an embodiment, when a trader finishes establishing a trading strategy, a new column could be automatically created in the trading strategy region 1202 to display the newly created strategy. Displaying trading strategies in a region other than the chart region 404 could be beneficial when a portion of the chart corresponding to the time when the trading strategy was established is no longer visible in the chart region 404. Additionally, viewing trading strategies in the trading strategy region 1202 is easier in relation to trading strategies that were placed by a trader closely in time to each other. If such trading strategies were displayed in the chart region 404, some of the order icons corresponding to each trading strategies would possibly overlap, thus, making it difficult to track or modify orders related to the trading strategies.

It should be understood that while displaying trading strategies in the trading strategy region 1202 is one possible implementation, some trading strategies could be displayed in the chart region 404 as well. For example, non-overlapping trading strategies could be displayed in the chart region 404 until the portion of the chart corresponding to the time when the strategies were established is no longer displayed in the chart region 404. Different embodiments are possible as well. It should be understood that where and when the trading strategies are displayed on the interface 1200 could be user-configurable.

Also, order indicators being used in relation to each trading strategy could be color-coded to distinguish an initiating order, a profit order, and a stop loss order. For example, referring to the trading strategy displayed in the column 1204, an order icon 1214 is an initiating strategy order, an order icon 1212 is a profit exit strategy order and would be submitted when a fill in relation to the initiating order was detected, and an order icon 1216 is a stop loss exit strategy order that would also be submitted when a fill in relation to the initiating order was detected. It should be understood that when a partial fill is detected in relation to the initiating order, the quantity of the profit exit order and loss stop orders could be modified accordingly to proportionately match the fill. According to one example embodiment, the order icon 1214 could be green, the icon 1212 could be orange, and the icon 1216 could be yellow. However, it should be understood that different colors could be used as well based on the trader's preferences. While each trading strategy illustrated in FIG. 12 includes three orders, it should be understood that a trader could create trading strategies with fewer or more orders as well.

It should be understood that a trader could modify price levels of each order in a trading strategy by simply dragging the corresponding order icons to desired locations. As shown in FIG. 12, the locations in each column of the trading strategy region 1202 are aligned with price levels displayed in the value axis 406. According to an alternative embodiment, the alignment could be established with the values in the value axis 414 instead. Different embodiments are possible as well.

It will be apparent to those of ordinary skill in the art that methods involved in the system and methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method for displaying market data for a tradeable object comprising:
    displaying a chart region aligned with a market grid region via a computing device, the chart region having a first value axis with a first plurality of values and a time axis, the market grid region having a second plurality of values along a second value axis and a plurality of areas associated with the market grid region for initiating placement of orders for a tradeable object;
    receiving a first user-initiated command via a user input device associated with the computing device to initiate placement of a trade order for the tradeable object at a price determined according to a selected area of the plurality of areas of the market grid region; and
    displaying a chart region indicator in the chart region and a working order indicator in the market grid region, where the chart region indicator represents the price in the chart region and the working order indicator represents the price in the market grid region.

2. The method of claim 1 further comprising:
    receiving an adjustment command via the user input device to adjust the second value axis to a second plurality of values; and
    adjusting the second value axis to the second plurality of values.

3. The method of claim 2 where the adjustment command is received via a graphical indicator for adjusting the second value axis and where the graphical indicator is moved relative to the first value axis to position the graphical indicator relative to the second plurality of values.

4. The method of claim 3 where the second plurality of values comprises any of a smaller number of values along the second value axis, a larger number of values along the second value axis, and the same number of values along the second value axis.

5. The method of claim 1, further comprising displaying a plurality of order indicators in the market grid region according to market data received from an electronic exchange.

6. The method of claim 5 where the plurality of order indicators comprises at least one best bid indicator for a highest bid price for the tradeable object and at least one best ask indicator for a lowest ask price for the tradeable object.

7. The method of claim 1, further comprising adjusting the second plurality of values in response to detecting a user-defined event according to market data for the tradeable object.

8. The method of claim 1 where the first value axis and the second value axis comprise prices for the tradeable object.

9. The method of claim 1 where the first value axis and the second value axis are static.

10. The method of claim 1, further comprising displaying an order action indicator at a location in the chart region based on the selected area.

11. The method of claim 1, further comprising receiving a second user-initiated command to select a location in the chart region for order placement for the tradeable object.

12. The method of claim 11, further comprising displaying an order action indicator relative to the market grid region based on the selected location in the chart region.

13. A computer readable medium having instructions stored thereon, which when executed by a processor cause the processor to carry out the acts comprising:
    displaying a chart region aligned with a market grid region, the chart region having a first value axis with a first plurality of values and a time axis, the market grid region having a second plurality of values along a second value axis and a plurality of areas associated with the market grid region for initiating placement of orders for a tradeable object;
    receiving a first user-initiated command to initiate placement of a trade order for the tradeable object at a price determined according to a selected area of the plurality of areas of the market grid region; and
    displaying a chart region indicator in the chart region and a working order indicator in the market grid region, where the chart region indicator represents the price in the chart region and the working order indicator represents the price in the market grid region.

14. The computer readable medium of claim 13 where the acts further comprise:
    receiving an adjustment command via a graphical indicator for adjusting the second value axis via the user input device to adjust the second value axis to a second plurality of values; and
    adjusting the second value axis to the second plurality of values.

15. The computer readable medium of claim 13 where the acts further comprise displaying a plurality of order indicators in the market grid region according to market data received from an electronic exchange, where the plurality of order indicators comprises at least one best bid indicator for a highest bid price for the tradeable object and at least one best ask indicator for a lowest ask price for the tradeable object.

16. The computer readable medium of claim 13 where the acts further comprise adjusting the second plurality of values in response to detecting a user-defined event according to market data for the tradeable object.

17. The computer readable medium of claim 13 where the first value axis and the second value axis comprise prices for the tradeable object and are static.

18. The computer readable medium of claim 13 where the acts further comprise displaying an order action indicator at a location in the chart region based on the selected area.

19. The computer readable medium of claim 13 where the acts further comprise:
   receiving a second user-initiated command to select a location in the chart region for order placement for the tradeable object; and
   displaying an order action indicator relative to the market grid region at a based on the selected location in the chart region.

20. A computing device having a graphical interface for trading a tradeable object, the computing device comprising:
   a processing device executing code including instructions to display the graphical interface having a chart region aligned with a market grid region, the chart region having a first value axis with a first plurality of values and a time axis, the market grid region having a second plurality of values along a second value axis and a plurality of areas associated with the market grid region for initiating placement of orders for a tradeable object,
   where in response to receiving a first user-initiated command to initiate placement of a trade order for the tradeable object at a price determined according to a selected area of the plurality of areas of the market grid region, a chart region indicator is displayed in the chart region and a working order indicator in the market grid region, and
   where the chart region indicator represents the price in the chart region and the working order indicator represents the price in the market grid region.

* * * * *